Figure 1:
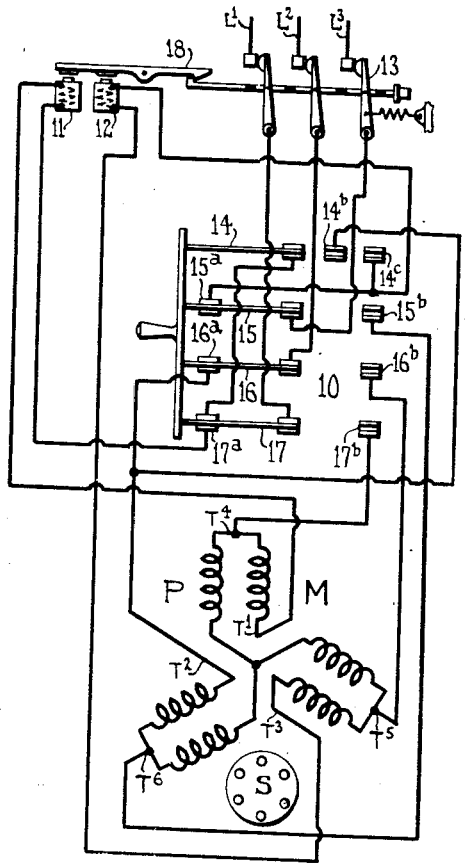

Aug. 6, 1929.

R. B. HUNTER 1,723,040

CIRCUIT CONTROLLER

Filed Feb. 2, 1925

INVENTOR
Richard B. Hunter
BY
Franklin H Hubbard
ATTORNEY

Patented Aug. 6, 1929.

1,723,040

UNITED STATES PATENT OFFICE.

RICHARD B. HUNTER, OF MILWAUKEE, WISCONSIN, ASSIGNOR, BY MESNE ASSIGNMENTS, TO CUTLER-HAMMER INC., OF MILWAUKEE, WISCONSIN, A CORPORATION OF DELAWARE.

CIRCUIT CONTROLLER.

Application filed February 2, 1925. Serial No. 6,222.

This invention relates to circuit controllers, and is particularly applicable to controllers for multispeed alternating current motors.

Multispeed alternating current motors are commonly provided with sectional windings capable of commutation to effect different pole groupings for different rates of speed, and it has heretofore been the usual practice to employ separate overload responsive elements for each pole grouping.

The present invention has among its objects to provide a circuit controller for motors of the aforesaid character wherein the same overload responsive elements are employed to effect overload protection of the motor for different speeds.

Another object is to provide a circuit controller for motors of the aforesaid character including a pole changing device having means associated therewith for connecting a single overload responsive element in the motor circuit in a manner to provide overload protection of the motor for different speeds thereof.

Various other objects and advantages of the invention will hereinafter appear.

The accompanying drawing illustrates an embodiment of the invention which will now be described, it being understood that the embodiment illustrated is susceptible of modification and is capable of use in connection with other types of motors than that shown in the drawing.

Figure 2:
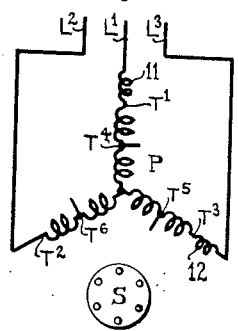
Figure 3:
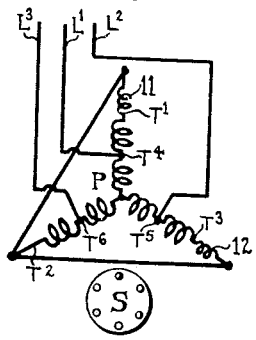

In the drawing:

Figure 1 diagrammatically illustrates a two speed three phase alternating current motor and a circuit controller therefor embodying the invention, and Figs. 2 and 3 are simplified diagrammatic views of the circuit connections to be established by the circuit controller shown in Fig. 1.

Referring to Fig. 1, the same illustrates a three phase multispeed alternating current motor M to be supplied with current from a three phase supply circuit indicated by lines $L^1$, $L^2$ and $L^3$. Motor M is of a two speed type, the same being provided with a sectional primary winding P and a secondary S which may be of the squirrel cage type. The sections of primary winding P are adapted to be connected in series star across lines $L^1$, $L^2$ and $L^3$ for low speed and in double star across said lines for high speed. As is well known the series star connections are established by connecting terminals $T^1$, $T^2$ and $T^3$ of the primary winding P to lines $L^1$, $L^2$ and $L^3$, respectively, while the double star connections are established by connecting terminals $T^4$, $T^5$ and $T^6$ to lines $L^1$, $L^2$ and $L^3$, respectively, with terminals $T^1$, $T^2$ and $T^3$ connected together.

The high and low speed connection of the primary winding P are adapted to be commutated by means of a double throw knife switch 10, said knife switch also serving as hereinafter set forth to include in the motor circuit tripping coils 11 and 12 of a circuit breaker 13. Knife switch 10 is provided with four movable poles 14, 15, 16 and 17, and in the left hand position of said switch, poles 15, 16 and 17 cooperate with stationary contacts $15^a$, $16^a$ and $17^a$, while in the right hand position of said switch, pole 14 cooperates with contacts $14^b$ and $14^c$, and poles 15, 16 and 17 cooperate with contacts $15^b$, $16^b$ and $17^b$, respectively. Circuit breaker 13 is biased towards open position and is held in closed position by a latching device 18 which is adapted to be tripped by one or both of the tripping coils 11 and 12.

The function and operation of the above described circuit controller, together with the circuit connections therefor, will now be more fully set forth. Assuming that knife switch 10 is in its left hand position, circuit is established from line $L^1$ through pole 17 and contact $17^a$ to and through the overload coil 11 to the terminal $T^1$ of the primary winding; from line $L^3$ through pole 15 and contact $15^a$ to and through the overload coil 12 to terminal $T^3$ of the primary winding; and, from line $L^2$ through pole 16 and contact $16^a$ to terminal $T^2$ of the primary winding, such connection being shown in Fig. 2. With the knife switch 10 in its right hand position, lines $L^1$, $L^2$ and $L^3$ are respectively connected to terminals $T^4$, $T^5$ and $T^6$ of the primary winding through engagement of poles 15, 16 and 17 with their cooperating contacts $15^b$, $16^b$ and $17^b$, and terminals $T^1$ and $T^2$ of the primary winding are connected to terminal $T^3$ through tripping coils 11 and 12, respectively, by engagement of pole 14 with contacts $14^b$ and $14^c$; such connections being shown in Fig. 3.

With the primary winding connected as shown in Fig. 2, a given number of poles are produced for operation of the motor at a given rate of speed, while connection of the same as shown in Fig. 3 halves the number of poles to provide for operation of the motor at twice such rate of speed. Assuming that the motor is capable of carrying a given load at low speed and twice such load at high speed, it is apparent that with the overload tripping coils 11 and 12 connected as shown the same will be subjected to the entire current from lines $L^1$ and $L^2$ when the motor is operating at low speed and to substantially one-half of the current from said lines when the motor is operating at high speed. The overload tripping coils 11 and 12 will thus function to trip the circuit breaker under like overload conditions when the motor is operating at either low or high speeds.

While the invention has been shown in connection with a two speed three phase alternating current motor, it is apparent that the same can be employed in connection with either a single phase motor or other types of polyphase motors.

What I claim as new and desire to secure by Letters Patent is:

1. The combination with an alternating current motor having a plurality of windings to be connected in different relations for different pole groupings, of an overload responsive element to be included in circuit with one of said motor windings upon connection thereof for said different pole groupings.

2. The combination with an alternating current motor having a plurality of windings to be connected in different relations for different pole groupings, each of said windings having substantially the same current carrying capacity when connected in said different relations, of an overload protective device having a tripping coil associated therewith to be included in circuit with one of said motor windings upon connection thereof for said different pole groupings.

3. The combination with an alternating current motor having a plurality of windings to be selectively connected in series and in parallel relation to effect different pole groupings, of an overload responsive element to be included in circuit with one of said windings upon connection thereof for said different pole groupings.

4. The combination with an alternating current motor having a plurality of windings, of a pole changing device for selectively connecting said windings in different relations with respect to each other for different pole groupings and an overload protective device having a tripping coil associated therewith to be included in circuit with one of said windings upon connection thereof for said different pole groupings.

5. The combination with a polyphase alternating current motor having a plurality of sets of sectional windings, of a pole changing device for selectively connecting said windings in different relations with respect to each other for different pole groupings and an overload device having a plurality of tripping coils associated therewith each to be included in circuit with one of said windings upon connection of the latter for said different pole groupings.

6. The combination with a dynamo electric machine having a plurality of windings, of means for interconnecting said windings in different circuit relations, and overload current protecting means connected in circuit with at least one of said windings and arranged to be interconnected therewith so as to be responsive to the current therein in each of said circuit relations.

In witness whereof, I have hereunto subscribed my name,

RICHARD B. HUNTER.